W. H. McCLINTOCK.
Churn.
No. 24,223.
Patented May 31, 1859.
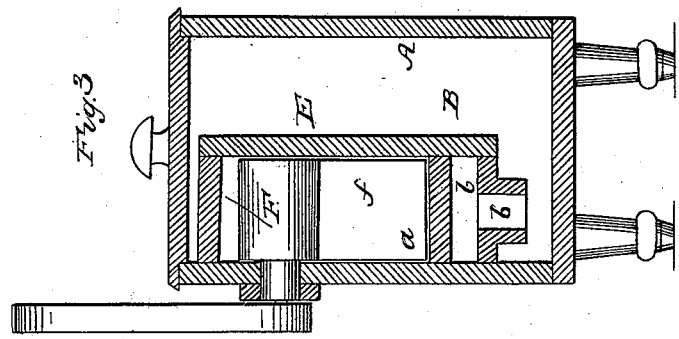
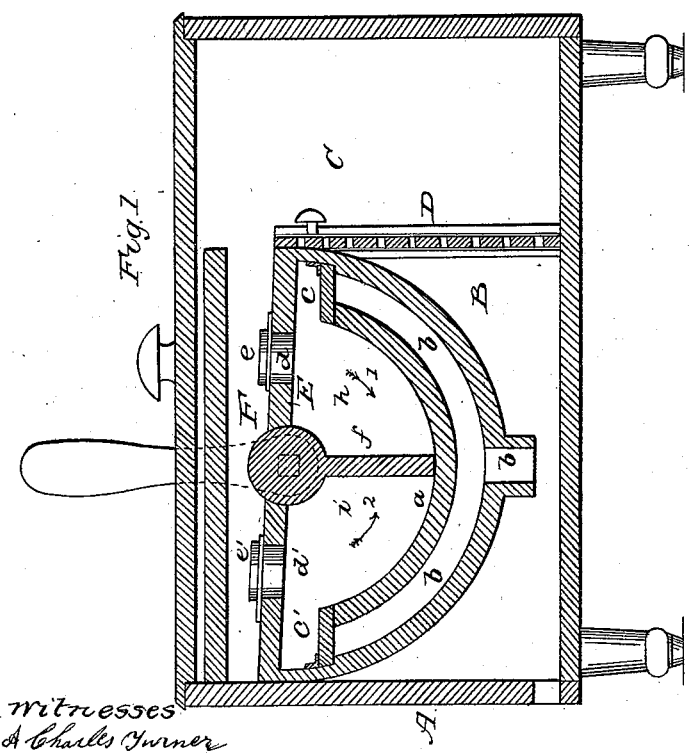
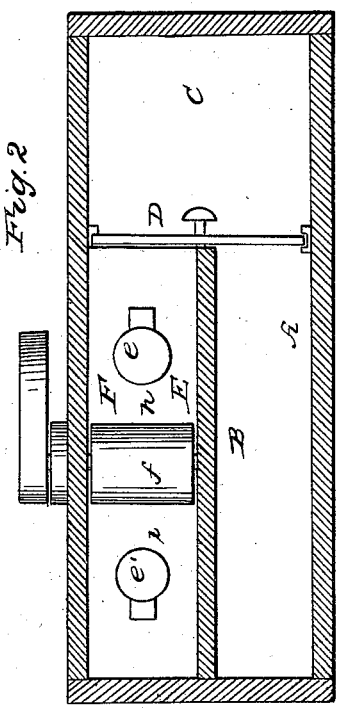

UNITED STATES PATENT OFFICE.

W. H. McCLINTOCK, OF FRANKFORT, OHIO.

CHURN.

Specification of Letters Patent No. 24,223, dated May 31, 1859.

*To all whom it may concern:*

Be it known that I, W. H. McClintock, of Frankfort, in the county of Ross and State of Ohio, have invented a new and useful Improvement in Churns; and I do hereby declare that the following is a full, clear, and exact description of the same, reference being had to the accompanying drawings, forming a part of this specification, in which—

Figure 1, is a vertical longitudinal section of a churn constructed after my invention. Fig. 2, is a horizontal section of the same. Fig. 3, is a vertical transverse section of the same.

Similar letters of reference, in each of the several figures indicate corresponding parts.

The nature of my invention consists in the employment of the within specified peculiarly constructed circularly vibrating suction and force pump, in combination with a churn constructed with a perforated partition, substantially in the manner and for the purpose herein described.

It consists second in the combination of a milk or cream supply chamber, butter separating or collecting chamber and a suction and force pump, substantially as hereinafter specified, whereby, by simply oscillating a piston, the cream is kept constantly circulating or moving, and in its movement brought in contact with friction or chafing surfaces in a manner to have its globules or sacks broken and the fatty matter contained in the same converted, and collected in a separate chamber, into a mass of butter.

The cream when the pump piston is moved in one direction is sucked up out of the cream chamber into the right hand section of the pump chamber, and when the piston is moved in an opposite direction the cream thus drawn into the right hand section is expelled; simultaneously with the expulsion of this cream a fresh supply is sucked up into the left section of the pump chamber, or caused to enter the same owing to a partial vacuum being formed behind the piston ready to be expelled by the return stroke of the piston. The cream expelled by the piston from the pump falls onto an inclined board, and is conducted by the same into the butter separating or collecting chamber and there deprived of the particles of butter which have been formed during its circulation, and again drawn into the cream chamber from whence it is raised by the action of the pump and again caused to circulate in the same manner as just described until all the fatty substance which forms butter is separated from it.

To enable others, skilled in the art, to make and use my invention, I will proceed to describe its construction and operation.

A, represents an oblong box. This box is divided into two chambers B, C, by a perforated partition D.

E, is a semicircular suction and force pump arranged in the milk or cream supplying chamber B, as shown in the drawing.

F, is a channel formed above the top of the pump and communicating only with the butter collecting chamber C, as shown.

The pump E, consists of a semi-circular chamber $a$, induction passage $b$, covered by flap valves $c$, $c'$, eduction passages $d$, $d'$, covered by valves $e$, $e'$, and circularly oscillating piston $f$, with handle or lever $g$, as shown.

From this description, it may be evident that when the piston is moved in the direction of the arrow 1, a vacuum will be created in the section $h$, of the pump chamber and consequently cream will ascend into said section from the chamber B, through the induction passage $b$, and its valve $c$. Now by moving the piston in the direction of arrow 2, the cream in section $h$, will be expelled into the channel F, through the valve $e$. Cream has by this time entered into section $i$, of the pump chamber through the induction passage $b$, and the valve $c'$. The cream first expelled flows into the chamber C, and by reason of the continued suction of the piston is caused to strain through the perforated partition D, and enter the cream or milk chamber again ready to be again similarly circulated, minus a greater portion of its fatty matter, said fatty matter remaining in the chamber C. Of course while the first expelled cream is passing from the pump back into the cream chamber B, it is followed by another quantity which was expelled through the valve $e'$, as the piston made its return stroke in the direction of the arrow 1. Thus it is the operation continues until the cream has been agitated or caused to circulate in contact with the surfaces of the pump, channel and straining partition, a sufficient length of time to be deprived of all the fatty substance which forms the butter. After the butter is produced and the butter milk let off through the opening *j*, water is introduced into the chamber B, and the pump operated so as to cause the water to circulate. By circulating the water, the churn is rinsed and butter is washed.

What I claim as my invention and desire to secure by Letters Patent, is—

The employment of the within specified peculiarly constructed circularly vibrating suction and force pump, in combination with a churn constructed with a perforated partition, substantially as and for the purpose set forth.

W. H. McCLINTOCK.

Witnesses:
 ISAAC CLAYPOOL,
 JOHN M. WISEHART.